United States Patent

[11] 3,537,375

| [72] | Inventors | Gerd Kiper<br>Ludersen;<br>Gunter Fauth, Unterhaching Near Munich, Germany |
|---|---|---|
| [21] | Appl. No. | 768,646 |
| [22] | Filed | Oct. 18, 1968 |
| [45] | Patented | Nov. 3, 1970 |
| [73] | Assignee | Agfa-Gevaert Aktiengesellschaft.<br>Leverkusen, Germany |
| [32] | Priority | Nov. 3, 1967 |
| [33] | | Germany |
| [31] | | 1,597,080 |

[54] PHOTOGRAPHIC CAMERA
23 Claims, 3 Drawing Figs.

| [52] | U.S. Cl. | 95/64, 95/10 |
|---|---|---|
| [51] | Int. Cl. | G03b 7/12, G03b 7/16 |
| [50] | Field of Search | 95/10(C), 64, 64(A), 11.5 |

[56] References Cited
UNITED STATES PATENTS

| 3,434,404 | 3/1969 | Kobanashi et al. | 95/10(C)UX |
| 3,443,496 | 5/1969 | Sauer et al. | 95/10(C)UX |
| 3,457,844 | 7/1969 | Kital | 95/10(C)UX |
| 3,463,066 | 8/1969 | Engeismann et al. | 95/10(C)UX |
| 3,464,333 | 9/1969 | Aoki et al. | 95/10(C)UX |
| 3,492,928 | 2/1970 | Kital | 95/64(A)UX |

Primary Examiner—John M. Horan
Assistant Examiner—Joseph F. Peters, Jr.
Attorney—Michael S. Striker ABSTRACT: A still camera wherein the diaphragm is adjustable by a first adjusting member as a function of the position of the needle of a light meter, and by a second adjusting member as a function of the position of the focussing member when a built-in or detachable illuminating arrangement is placed into operative position. The second adjusting member overrides the first adjusting member when the aperture size selected as a function of the position of the focussing member is smaller than the aperture size which would be selected by the first adjusting member as a function of the position of the needle, or vice versa. The diaphragm is further adjustable by a selector as a function of the guide number of the illuminating arrangement.

Patented Nov. 3, 1970

3,537,375

INVENTOR.
GERD KIPER
GÜNTER FAUTH

BY Michael S. Striker
Attorney

Patented Nov. 3, 1970

INVENTOR.
GERD KIPER
GÜNTER FAUTH

BY Michael S. Striker
Attorney 3,537,375

PHOTOGRAPHIC CAMERA

BACKGROUND OF THE INVENTION

The present invention relates to photographic apparatus in general, and more particularly to improvements in cameras which can be utilized for making exposures in daylight and/or with artificial illumination of the subject or scene. Still more particularly, the invention relates to improvements in cameras wherein the aperture size and/or the exposure time can be selected automatically as a function of scene brightness when the camera is to make an exposure in daylight and wherein the aperture size can be selected as a function of the distance between the camera and the subject or scene when the exposure is to be made in artificial light.

It is already known to provide a camera with a diaphragm and with a shutter which can be adjusted automatically as a function of scene brightness for making exposures in daylight, and wherein the device which brings about such automatic adjustment is ineffective when the camera is to make exposures in artificial light, i.e., when a flash unit or the like is placed in operative position. It is also known to provide a camera with an automatic adjusting device for the shutter and diaphragm which is effective for operation in daylight and which remains effective, under certain circumstances, when the camera is ready to make exposures in artificial light. Such automatic device is rendered ineffective when the intensity of scene light prior to firing of a bulb or the like is below a predetermined minimum value. In order to insure satisfactory light output for exposures which are to be made in artificial light in the absence of any daylight, such cameras are provided with means for automatically selecting a relatively long exposure time when the illuminating arrangement is placed in operative position, for example, when a multiple flashbulb container is inserted into an indexible socket provided therefor on the body of the camera. Such exposure time is normally one-thirtieth of a second or thereabout which is unsatisfactory when the illuminating arrangement is used in daylight, i.e., when a scene or subject is to be illuminated by natural light as well as by artificial light. Furthermore, it happens quite frequently that the user of a camera cannot prevent so-called camera shake when the exposure time is one-thirtieth of a second or a similar exposure time. Still further, when the illuminating arrangement is used in daylight, the aperture size furnished by the diaphragm is always determined by the illuminating arrangement, not by the device which automatically selects the aperture size for making exposures in daylight alone. This can lead to overexposures when the illuminating arrangement is used to furnish artificial light for an exposure which is being made in bright daylight because the aperture size selected by the illuminating arrangement and intended mainly for making of exposures in artificial light without daylight is often too large for an exposure which is made in relatively bright daylight.

SUMMARY OF THE INVENTION

It is one of several important objects of our present invention to provide a photographic apparatus which can make satisfactory exposures in daylight, in artificial light, as well as when the exposures are being made in daylight with simultaneous utilization of a device which fires flashbulbs, of an electronic flash or of another suitable illuminating arrangement.

Another object of the invention is to provide a photographic camera which is constructed and assembled in such a way that the film is not overexposed when the exposure is to be made in daylight with simultaneous utilization of an illuminating arrangement.

A further object of the invention is to provide a photographic camera which can discriminate between exposure values which are to be selected in response to placing of an illuminating arrangement in operative position and exposure values which are to be selected as a function of the intensity of natural scene light, and which invariably selects the exposure values (namely, the exposure time and/or the aperture size) in such a way that the film is not overexposed when the illuminating arrangement is to be used at a time when the subject or scene is exposed to daylight.

An additional object of the invention is to provide a camera of the above outlined character which can be utilized with different types of illuminating arrangements and wherein the selection of exposure values can be made by full consideration of the characteristics (particularly of the guide number) of that illuminating arrangement which is to be used for making an exposure in artificial light alone or in daylight plus artificial light.

The improved camera comprises exposure meter means (for example, an exposure meter including a moving-coil instrument) having an output member (e.g., the needle of the moving-coil instrument) which is movable between a plurality of positions as a function of the intensity of scene light, adjustable exposure controlling means (including an adjustable diaphragm and an adjustable shutter) arranged to furnish a range of exposure values (namely, exposure times and/or aperture sizes), first adjusting means for the exposure controlling means arranged to select an exposure value as a function of the position of the output member, an illuminating arrangement at least a portion of which is movable between operative and inoperative positions (for example, the illuminating arrangement may comprise a built-in flash unit wherein the container for one or more flashbulbs is movable between operative and inoperative positions by being respectively attached to or separated from an indexible socket in the camera body), focussing means movable between a plurality of positions each of which is indicative of a different distance between the camera and the subject or scene, and second adjusting means for the exposure controlling means arranged to select an exposure value as a function of the position of the focussing means in operative position of the aforementioned portion of the illuminating arrangement. An important feature of our invention resides in that the first adjusting means overrides the second adjusting means when the exposure value (particularly the aperture size) which is selected as a function of the position of the output member (i.e., as a function of the intensity of natural scene light) corresponds to an intensity of scene light which is higher than that corresponding to the exposure value which would be selected by the second adjusting means in operative position of the portion of the illuminating arrangement as a function of the position of the focussing means, or vice versa. In this way, the camera invariably selects the smaller aperture size, regardless of whether the selection is made in response to placing of the illuminating arrangement in operative condition and in further response to appropriate adjustment of the focussing means, or whether the selection is made as a function of the position of the output member of the exposure meter means in dependency on the intensity of natural scene light, i.e., of that light to which the subject or scene is exposed prior to firing of a flashbulb or the like.

The exposure meter means preferably comprises a detector which is movable from a starting position through different distances in response to actuation of the shutter release trigger to engage with the output member whereby the extent of movement of the detector from starting position indicates the intensity of scene light. The first adjusting means may include a lever which is pivotable by the detector to an extent which is a function of the extent of movement of the detector from starting position into engagement with the output member. The lever of the first adjusting means is preferably coupled with at least one of two interconnected or independently adjustable setting members one of which can adjust the diaphragm and the other of which can adjust the shutter, and such one setting member is then adjusted to an extent which is a function of the extent of pivotal movement of the lever of the first adjusting means under the action of the detector. This one setting member is further adjustable by the second adjusting means when warranted, i.e., when the second adjusting means is capable of moving the one setting member beyond the position which the one setting member would assume in response to adjustment by the lever of the first adjusting means. The second adjusting means is rendered ineffective (i.e., it cannot adjust the one setting member) in automatic response to placing of the illuminating arrangement in inoperative condition.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTIONS OF THE PREFERRED EMBODIMENTS

Figure 1:
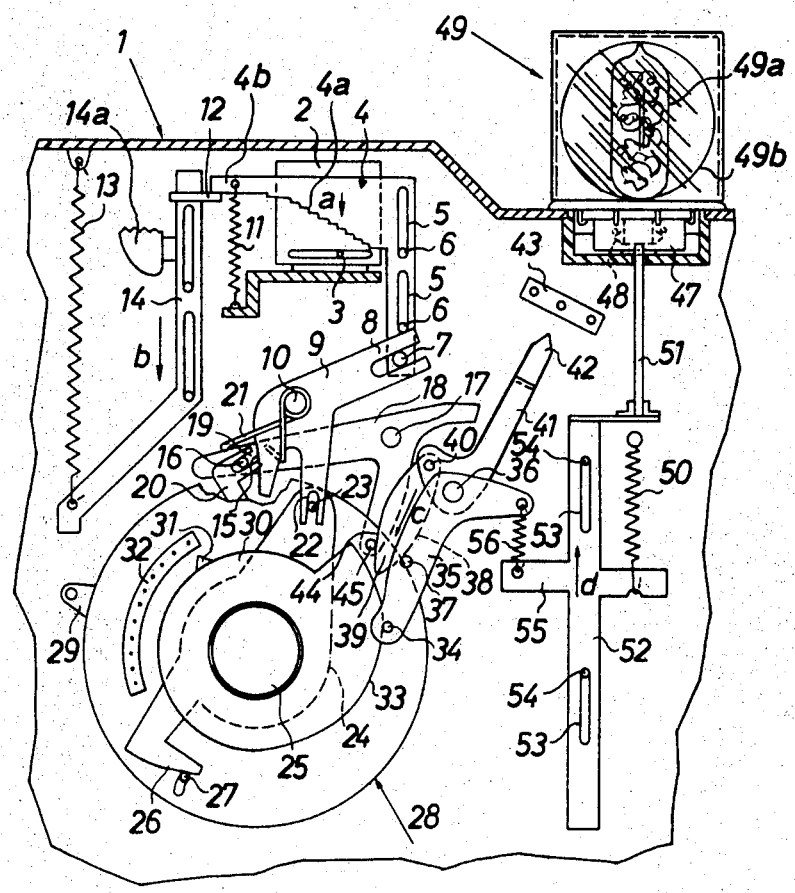
FIG. 1 is a fragmentary longitudinal vertical sectional view of a still camera which embodies one form of the invention.

FIG. 1 illustrates a portion of a still camera which comprises a housing or body 1 and accommodates a built-in exposure meter. The latter includes a light meter 2 (e.g., a customary moving-coil instrument) having a needlelike output member 3 which is movable to a plurality of positions each indicative of a different scene brightness. The circuit of the light meter 2 includes a photoelectric receiver (not shown) which is exposed to scene light and effects appropriate adjustments of the output member 3. A scanning member or detector 4 of the exposure meter is formed with elongated slots 5 for guide pins 6 which are affixed to the housing 1. A spring 11 biases the detector 4 downwardly from the illustrated starting position so that its stepped scanning face 4a tends to engage the output member 3 and to urge it against a stationary back support or stop, not shown. The detector 4 carries a motion transmitting pin or post 7 which extends into a slot provided in one arm 8 of a first adjusting lever 9 fulcrumed on a pivot pin 10 which is affixed to the housing 1. The spring 11 tends to urge the detector 4 in the direction indicated by arrow a whereby an extension 4b of the detector bears against a stop 12 provided on a reciprocable shutter release trigger 14 which is movable to and from the starting position shown in FIG. 1. The trigger 14 has a knob 14a which can be depressed by hand in the direction indicated by arrow b. A helical return spring 13, which is stronger than the spring 11, urges the trigger 14 toward the starting position. The manner in which the trigger 14 is mounted in the housing 1 for reciprocatory movement in and counter to the direction indicated by arrow b is plainly shown in the drawing.

The adjusting lever 9 has a cam face 15 which can displace a pin-shaped follower 16 provided on a diaphragm setting lever 18 which is pivotable on a pin 17 secured to the housing 1. The follower 16 of the setting lever 18 extends into a slot 19 provided in a diaphragm blade or vane 20 which normally assumes a fully open position corresponding to the maximum size of the aperture. If desired, the vane 20 can be replaced by a different vane which is movable from a cocked position toward an uncocked position in response to actuation of the trigger 14 to thereby gradually increase the aperture size. The follower 16 or the setting lever 18 is then mounted in such a way that it can arrest the movement of the vane from cocked position and thereby maintains the diaphragm in closed position. It is also possible to replace the illustrated diaphragm (having a single vane 20) with a diaphragm having two or more vanes, for example, with a diaphragm having two vanes which resemble two-armed levers movable in opposite directions and coupled to the follower 16 by means of a customary pin-and-slot connection. Still further, the setting lever 18 can be operatively connected with the customary ring of an iris diaphragm by means of a pin-and-slot connection to adjust the size of the aperture as a function of the angular position of the output member 3. Still further, the lever 18 can be provided with a follower (such as the member 16) which tracks the face 15 of or otherwise cooperates with the adjusting lever 9, and with one or more additional pin-shaped parts which effect adjustment of a simple or more sophisticated diaphragm. The just described possibilities of altering the operative connection between the adjusting lever 9 and the setting means of a simple or a relatively complicated diaphragm are not shown in the drawing because the exact nature of the diaphragm and/or of its connection with the adjusting member 9 can be altered in a number of ways without departing from the spirit of our invention.

The camera further comprises a torsion spring 21 which is mounted on the pivot pin 10 and tends to bias the follower 16 and the cam face 15 against each other. The adjusting lever 9 comprises a bifurcated arm 22 whose prongs straddle a follower 23 provided on a shutter setting member 24 which can select the exposure time as a function of the position of the lever 9. The setting member 24 is turnable about the optical axis of the objective 25 and is formed with a cam face 26 cooperating with a follower 27 of the shutter. The latter has a housing 28. A trip 29 extends from the housing 28 and into the path of movement of the lower end portion of the trigger 14 to effect opening of the shutter when the trigger is moved almost all the way from its illustrated starting position.

The objective 25 (or its front lens) can be moved axially by a focus adjusting or focussing member 30 having an index 31 which is movable with reference to a fixed scale 32 whose graduations indicate various distances of the camera from the scene or subject. The focussing member 30 is further provided with a cam face 33 which cooperates with the follower 34 of a second adjusting member 35 forming part of a device which can adjust the aperture size as a function of the distance between the camera and the subject or scene. The second adjusting member 35 is a lever which is pivotable on a fixed pin 36 and carries a post 37 cooperating with the cam face 38 of an intermediate lever 39. The latter is pivotable on a pivot pin 40 provided on a selector 41 which can adjust the diaphragm as a function of, e.g., the guide number of an illuminating arrangement. The selector 41 has an index or pointer 42 movable along a scale 43 which is graduated to indicate various guide numbers or other characteristics of different types of illuminating arrangements having different light outputs. A second cam face 44 of the intermediate lever 39 can displace a follower 45 provided on the diaphragm setting lever 18.

The camera also comprises a built-in illuminating arrangement which includes a socket 47 indexible in the housing 1 and adapted to receive the plug 48 of a multiple flashbulb holder or container 49 here shown as a "Flashcube" with four flashbulbs 49a each located in front of a reflector 49b. The socket 47 has an axial bore or passage for the upper end portion of a motion transmitting or displacing rod 51 which is biased upwardly by a helical spring 50 and is mounted on a reciprocable slide or holder 52 provided with elongated slots 53 for guide pins 54 affixed to the housing 1. The slide 52 has an extension or arm 55 connected to one end of a helical spring 56 the other end of which is attached to the adjoining arm of the adjusting lever 35. The spring 56 constitutes an elastic coupling between the displacing rod 51 and the adjusting member 35.

FIG. 1 illustrates the multiple flashbulb container 49 of the built-in illuminating arrangement in operative position, i.e., with the plug 48 inserted into the socket 47 so that the displacing rod 51 is held in its lower end position against the opposition of the spring 50 whereby the coupling spring 56 biases the adjusting lever 35 in a clockwise direction. The camera is ready to make an exposure with artificial illumination of the subject in response to depression of the release trigger 14 (arrow b). During the first stage of downward movement of the trigger 14 in response to application of finger pressure against the knob 14a, the spring 11 contracts and moves the detector 4 downwardly until the stepped face 4a engages the output member 3. The position of the output member 3 is a function of scene brightness and, therefore, the position of the adjusting lever 9 is also a function of scene brightness. Downward movement of the detector 4 under the action of spring 11 (arrow a) causes the post 7 to turn the adjusting lever 9 in a clockwise direction, as viewed in FIG. 1, until the face 4a reaches and engages the output member 3. If the intensity of natural scene light is greater than the intensity of artificial light which is to be produced by a flashbulb 49a and is to be reflected on the subject or scene, the cam face 15 of the adjusting lever 9 moves against the follower 16 during downward movement of the detector 4 from starting position and the follower 16 causes the diaphragm setting member 18 to turn in a clockwise direction. As stated before, the vane 20 furnishes a maximum aperture size when in normal position and is adjustable by the setting member 18, either by way of the adjusting member 9 or by way of the adjusting member 35, to furnish an aperture whose size is less than the maximum size. Of course, as the adjusting member 9 turns in response to downward movement of the detector 4, it automatically adjusts the shutter in the housing 28 by selecting an appropriate exposure time through the intermediary of the arm 22, follower 23, setting member 24, cam face 26, and follower 27. Thus, the aperture size and the exposure time are functions of scene brightness as determined by the position of the output member 3. When the trigger 14 approaches its lower end position, it engages the trip 29 and releases the shutter to thereby initiate the exposure.

If the intensity of natural scene light is low, i.e., if such intensity is so low that the output member 3 assumes a position in which the detector 4 causes the adjusting lever 9 to select a relatively large aperture size which would be proper if the exposure were made in natural scene light but would be too large in view of the emission of artificial light by one of the flashbulbs 49a (which is fired automatically in response to release of the shutter in the housing 28), the other adjusting member 35 takes over (i.e., it overrides the adjusting lever 9) and effects appropriate adjustment of the aperture size in the following way. If the distance between the camera and the scene or subject is short, the focussing member 30 is adjusted accordingly by turning it about the axis of the objective 25 until the index 31 registers with the appropriate graduation on the scale 32. Such adjustment of the focussing member 30 causes the follower 34 to change the angular position of the adjusting lever 35 by enabling the coupling spring 56 to turn this lever in a clockwise direction through an angle of considerable magnitude whereby the post 37 pivots the intermediate lever 39 and the latter causes the follower 45 to change the angular position of the diaphragm setting lever 18 by turning this lever in a clockwise direction so that the follower 16 moves away from the cam face 15 of the adjusting lever 9. Consequently, the setting member 18 adjusts the vane 20 of the diaphragm in a sense to reduce the aperture size below the size which would be selected were the setting member 18 adjusted by the lever 9 as a function of the position of the output member 3. The release trigger 14 is then moved in the direction indicated by arrow b whereby the spring 11 moves the detector 4 downwardly (arrow a) through a relatively short distance (because the intensity of scene light is low) so that the clockwise angular displacement of the adjusting lever 9 by way of the pin 7 does not suffice to move the cam face 15 into engagement with the follower 16. In other words, the position of the diaphragm vane 20 is determined exclusively by the adjusting member 35 by way of the intermediate lever 39 and follower 45. It will be seen that the diaphragm vane 20 is adjustable either by the lever 9 (when the intensity of scene light is relatively high) or by the lever 35 (when the intensity of scene light is so low that the film would be overexposed, at least when the camera is close to the subject, in response to firing of one of the flashbulbs 49a when the trigger 14 engages the trip 29). The adjusting action of the lever 35 prevails when the scene brightness prior to firing of a flashbulb is low, and the adjusting action of the lever 9 prevails when the intensity of scene light prior to firing of a flashbulb is sufficiently high to ensure satisfactory exposure with an aperture size of substantially less than maximum value, i.e., with an aperture size which is less than that warranted by the firing of a flashbulb.

If the built-in illuminating arrangement including the parts 47—49 is replaced with a different illuminating arrangement having a high guide number (e.g., with an electronic flash), and if the distance between the scene and the camera is relatively large, the end effect is the same as in the just described situation. In such instance, the selector 41 is adjusted to move its pointer 42 into registry with the appropriate graduation on the scale 43, namely, with a graduation indicating a high guide number. The selector 41 changes the position of the intermediate lever 39 by moving the latter in the direction indicated by arrow c so that the lever 39 is wedged between the parts 37 and 45 and causes a certain angular displacement of the diaphragm setting member 18 because the bias of the coupling spring 56 is stronger than that of the torsion spring 21. The diaphragm setting member 18 turns in a clockwise direction but the angular position of the adjusting member 35 remains practically unchanged. This reduces the aperture size to an extent which is a function of the high guide number of the illuminating arrangement.

If the multiple flashbulb holder 49 is removed, the spring 50 is free to shift the displacing rod 51 upwardly so that the upper end portion of this rod penetrates into the empty socket 47 and the holder or slide 52 moves upwardly (arrow d) to entrain its extension 55 and to reduce the stress upon the coupling spring 56. The extension 55 moves into actual engagement with and pivots the adjusting lever 35 in a counterclockwise direction so that the follower 34 moves away from the cam face 33 on the focussing member 30. The torsion spring 21 is then free to pivot the diaphragm setting member 18 and hence the intermediate lever 39 so that the follower 16 returns into or remains in abutment with the cam face 15 of the adjusting lever 9. In other words, the adjusting lever 35 is rendered ineffective in automatic response to withdrawal of the plug 48 from the socket 47 (inoperate condition of the built-in illuminating arrangement) and the aperture size is then determined exclusively by the adjusting member 9 as a function of scene brightness, i.e., as a function of the position of the output member 3.

The parts 16, 18, 20, 22, 23, 24, 26, 27, 28, 29 constitute an exposure controlling assembly which can furnish a range of exposure values (exposure times and/or aperture sizes) in dependency on the position of the output member 3 when the adjusting lever 9 overrides the adjusting lever 35 or in dependency on the position of the focussing member 30 when the adjusting lever 35 overrides the adjusting lever 9 in operative position of the multiple flash bulb container 49.

Figure 2:
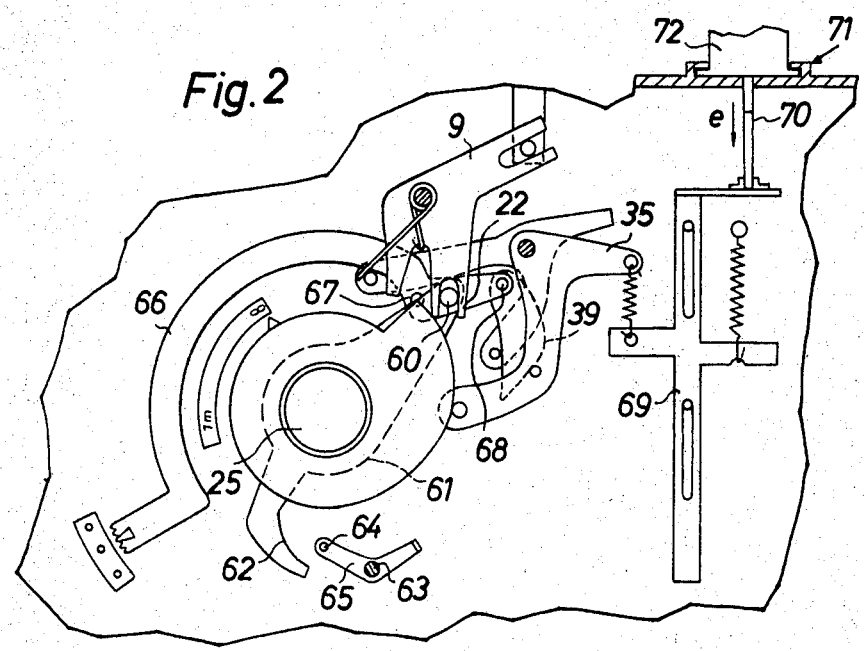
FIG. 2 is a fragmentary longitudinal vertical sectional view of a second camera.

FIG. 2 shows a portion of a modified camera wherein the bifurcated arm 22 of the adjusting lever 9 engages a follower 60 provided on an exposure time setting member 61 which has a stop face 62 for a lever 65 which is mounted on a pivot pin 63 and has a pin 64 engageable with the stop face 62. The lever 65 serves to control the movements of two shutter blades (not shown) which move in opposite directions. The arrangement is such that the stop face 62 moves closer to the pin 64 when the intensity of scene light is higher so that the lever 65 then performs a shorter pivotal movement in response to impact transmitted thereto by a customary impeller of the shutter, not shown. In other words, the stop face 62 reduces the extent of pivotal movement of the lever 65 as a function of scene brightness and in a sense to furnish a shorter exposure time in response to increasing scene brightness. This is due to the fact that the time required by the two shutter blades to reach the positions of maximum deviation from their normal positions is shortened with attendant reduction in exposure time.

The selector 41 of FIG. 1 is replaced by a selector 66 which surrounds a portion of the objective 25 and is pivotable on a fixed pin 67. The selector 66 carries a pivot pin 68 for the intermediate lever 39 which is analogous to the similarly numbered element of the camera shown in FIG. 1.

FIG. 2 further shows a reciprocable slide or holder 69 for a displacing or motion transmitting rod 70 which is biased upwardly so that it tends to move to its upper end portion and into an accessory shoe 71 provided on the top wall of the camera body. The shoe 71 can receive the foot 72 of a detachable illuminating arrangement (e.g., an electronic flash) and, when the foot is properly inserted into the shoe, it moves the rod 70 downwardly as indicated by the arrow e. Otherwise, the operation of the camera shown in FIG. 2 is analogous to that of the previously described camera.

Figure 3:
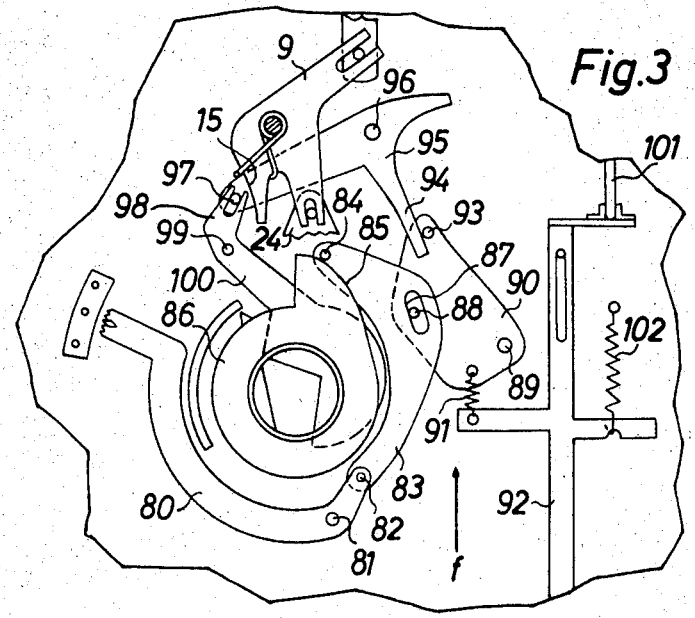
FIG. 3 is a fragmentary longitudinal vertical sectional view of a third camera.

The camera of FIG. 3 comprises a different system for adjusting the diaphragm in dependency on the distance from the subject. This camera comprises a selector 80 for guide numbers which is pivotable on a fixed pin 81 and carries a pivot pin 82 for an intermediate lever 83. The lever 83 has a pin 84 which constitutes a follower and cooperates with the cam face 85 of a focussing member 86. The lever 83 is formed with a slot 87 for the follower 88 of an adjusting lever 90 which is pivotable on a pin 89. The adjusting lever 90 has a pin 93 which cooperates with the arm 94 of a diaphragm setting member 95. The latter is pivotable on a fixed pin 96 and has a pin 97 which extends into the forked arm 98 of a diaphragm vane 100 pivotable on a pin 99. The pin 97 can also cooperate with the cam face 15 of the adjusting member 9 which is mounted in the same way as shown in FIG. 1. In this embodiment of our invention, the focussing member 86 adjusts the lever 90 by way of the intermediate lever 83.

FIG. 3 illustrates the camera in a condition ready for making an exposure with artificial illumination of the subject. The slide or holder 92 is held in its lower end position, either because the displacing rod 101 is expelled from a socket (such as the socket 47 of FIG. 1) or because the rod 101 is expelled from a shoe (such as the shoe 71 of FIG. 2). If the operator manipulates the focussing member 86, the cam face 85 of the focussing member causes the pin 84 to turn the intermediate lever 83 in a clockwise or in a counterclockwise direction. The adjusting member 90 follows the movement of the intermediate lever 83 because its pin 88 engages with the slot 87 and is biased against the surface surrounding this slot by the coupling spring 91. The pin 93 thereby influences the position of the setting lever 95 and hence the size of the aperture defined by the vane 100.

If the operator adjusts the position of the selector 80, the latter causes the pivot pin 82 to travel along an arcuate path about the axis of the pin 81. The pin 82 is at a standstill during adjustment of the focussing member 86. As the pin 82 moves in response to a change in the position of the selector 80, the intermediate lever 83 also changes its position because the pin 82 constitutes a fulcrum for this lever. The surface surrounding the slot 87 then causes the follower pin 88 to change the position of the adjusting member 90 and to thus influence the position of the vane 100 and the aperture size by way of the setting member 95.

If the illuminating arrangement for the camera of FIG. 3 is moved to inoperative position so that the displacing rod 101 can move upwardly under the action of the spring 102, the slide 92 moves in the direction indicated by arrow f and engages the adjusting lever 90 to pivot the latter in a clockwise direction and to thus move the pin 93 away from the arm 94 of the setting member 95. Thus, the setting member 95 is then adjustable only by the lever 9 in the same way as described in connection with FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

I claim:

1. In a photographic camera, a combination comprising exposure meter means having an output member movable between a plurality of positions as a function of the intensity of scene light; adjustable exposure controlling means arranged to furnish a range of exposure values; first adjusting means for said exposure controlling means arranged to select an exposure value as a function of the position of said output member; an illuminating arrangement at least a portion of which is movable between operative and inoperative positions; focussing means movable between a plurality of positions each indicative of a different distance between the camera and the scene; and second adjusting means for said exposure controlling means arranged to select an exposure value as a function of the position of said focussing means in operative position of said portion of said illuminating arrangement, said first adjusting means overriding said second adjusting means when the exposure value selected as a function of the position of said output member corresponds to an intensity of scene light which is higher than that corresponding to the exposure value which would be selected by said second adjusting means as a function of the position of said focussing means in operative position of said portion of said illuminating arrangement, or vice versa.

2. A combination as defined in claim 1, wherein said exposure controlling means comprises adjustable diaphragm means arranged to furnish a range of aperture sizes and wherein said first and second adjusting means are arranged to respectively select the aperture size as a function of the position of said output member and as a function of the position of said focussing means, said first adjusting means overriding said second adjusting means when the aperture size selected as a function of scene brightness is smaller than the aperture size which would be selected by said second adjusting means as a function of the position of said focussing means in operative position of said portion of said illuminating arrangement, or vice versa.

3. A combination as defined in claim 1, wherein said exposure controlling means comprises adjustable diaphragm means arranged to furnish a range of aperture sizes and adjustable shutter means arranged to furnish a range of exposure times, said first adjusting means being arranged to select the aperture size and the exposure time as a function of the position of said output member and said second adjusting means being arranged to select the aperture size as a function of the position of said focussing means in operative position of said portion of said illuminating arrangement, said first adjusting means overriding said second adjusting means when the aperture size selected as a function of the position of said output member is smaller than the aperture size which would be selected by said second adjusting means as a function of the position of said focussing means in operative position of said portion of said illuminating arrangement, or vice versa.

4. A combination as defined in claim 1, wherein said exposure meter means further comprises detector means movable from a starting position through different distances into engagement with said output member and wherein said first adjusting means is movable by said detector means.

5. A combination as defined in claim 1, wherein said output member is movable between said positions as a function of the intensity of daylight and wherein said second adjusting means is ineffective in inoperative position of said portion of said illuminating arrangement.

6. A combination as defined in claim 1, wherein said exposure controlling means comprises a setting member which is movable by each of said adjusting means and wherein said setting member is moved by said first adjusting means when the intensity of scene light corresponding to the exposure value selected as a function of the position of said output member is higher than the intensity of scene light corresponding to the exposure value which would be selected by said second adjusting means as a function of the position of said focussing means in operative position of said portion of said illuminating arrangement, or vice versa.

7. A combination as defined in claim 1, wherein said exposure controlling means comprises a movable diaphragm setting member and a movable shutter setting member, said first adjusting means comprising an adjusting member arranged to move at least one of said setting members as a function of the position of said output member.

8. A combination as defined in claim 1, wherein said exposure controlling means comprises at least one movable setting member and further comprising first and second coupling means respectively provided between said exposure meter means and said first adjusting means and between said first adjusting means and one said setting member.

9. A combination as defined in claim 8, wherein at least one of said coupling means comprises a pin-and-slot connection.

10. A combination as defined in claim 1, wherein said exposure controlling means comprises at least one pivotable setting lever and wherein each of said adjusting means comprises a pivotable lever.

11. A combination as defined in claim 1, further comprising selector means movable between a plurality of positions each indicating a characteristic of a plurality of different illuminating arrangements, and movable intermediate means cooperating with said second adjusting means for adjusting said exposure controlling means as a function of the position of said selector means.

12. A combination as defined in claim 11, wherein said intermediate means is interposed between said second adjusting means and said exposure controlling means.

13. A combination as defined in claim 11, wherein said second adjusting means is interposed between said intermediate means and said exposure controlling means.

14. A combination as defined in claim 11, wherein said selector means comprises a first lever which is pivotable between said positions thereof and wherein said intermediate means comprises a second lever which is pivotably supported by said first lever.

15. A combination as defined in claim 11, further comprising cooperating cam and follower means provided on said intermediate means and said second adjusting means.

16. A combination as defined in claim 11, further comprising cooperating cam and follower means provided on said focussing means and said intermediate means.

17. A combination as defined in claim 1, further comprising resilient coupling means for biasing said second adjusting means toward said exposure controlling means in operative position of said portion of said illuminating arrangement.

18. A combination as defined in claim 17, wherein said coupling means is arranged to render said second adjusting means ineffective in response to movement of said portion of said illuminating arrangement to inoperative position.

19. A combination as defined in claim 18, further comprising displacing means movable between first and second positions in response to movement of said portion of said illuminating arrangement between operative and inoperative positions, said coupling means comprising a spring connecting said displacing means with said second adjusting means.

20. A combination as defined in claim 19, wherein said displacing means comprises a reciprocable member and said spring is connected between said second adjusting means and said reciprocable member to render said second adjusting means ineffective in the second position of said reciprocable member.

21. A combination as defined in claim 1, wherein said second adjusting means is ineffective in the inoperative position of said portion of said illuminating arrangement and wherein said illuminating arrangement comprises a flash unit which is built into the camera, said portion of said illuminating arrangement comprising a multiple flashbulb container which is detachable from the remainder of said illuminating arrangement to thereby render said second adjusting means ineffective.

22. A combination as defined in claim 1, wherein said second adjusting means is ineffective in the inoperative position of said portion of said illuminating arrangement and wherein said illuminating arrangement further comprises a shoe and said portion thereof includes a foot which is removably accommodated in said shoe and is arranged to render said second adjusting means ineffective in response to removal from said shoe.

23. A combination as defined in claim 22, wherein said illuminating arrangement is an electronic flash unit.